US010522796B2

(12) United States Patent
Ladroue et al.

(10) Patent No.: US 10,522,796 B2
(45) Date of Patent: Dec. 31, 2019

(54) BATTERY WITH FRONT FACE AND REAR FACE CONTACTS

(71) Applicant: STMicroelectronics (Tours) SAS, Tours (FR)

(72) Inventors: Julien Ladroue, Monnaie (FR); Mohamed Boufnichel, Monnaie (FR)

(73) Assignee: STMicroelectronics (Tours) SAS, Tours (FR)

( * ) Notice: Subject to any disclaimer, the term of this patent is extended or adjusted under 35 U.S.C. 154(b) by 218 days.

(21) Appl. No.: 15/699,233

(22) Filed: Sep. 8, 2017

(65) Prior Publication Data

US 2018/0219194 A1 Aug. 2, 2018

(30) Foreign Application Priority Data

Jan. 31, 2017 (FR) ...................................... 17 50771

(51) Int. Cl.
| | | |
|---|---|---|
| H01M 2/06 | (2006.01) |
| H01M 2/02 | (2006.01) |
| H01M 10/058 | (2010.01) |
| H01M 2/20 | (2006.01) |
| H01M 2/30 | (2006.01) |
| H01M 10/04 | (2006.01) |
| H01M 10/0525 | (2010.01) |

(52) U.S. Cl.
CPC ............. *H01M 2/06* (2013.01); *H01M 2/026* (2013.01); *H01M 2/0215* (2013.01); *H01M 2/0217* (2013.01); *H01M 2/0267* (2013.01); *H01M 2/0287* (2013.01); *H01M 2/204* (2013.01); *H01M 2/30* (2013.01); *H01M 10/058* (2013.01); *H01M 10/0436* (2013.01); *H01M 10/0525* (2013.01); *H01M 2220/30* (2013.01)

(58) Field of Classification Search
CPC ... H01M 2/0285; H01M 2/0277; H01M 2/028
See application file for complete search history.

(56) References Cited

U.S. PATENT DOCUMENTS

| | | | | |
|---|---|---|---|---|
| 6,998,221 B2 * | 2/2006 | Kirmse | ............ | H01L 21/31116 216/51 |
| 8,840,686 B2 * | 9/2014 | Bouillon | ............. | H01M 2/1061 29/623.2 |
| 9,455,423 B2 * | 9/2016 | Etzkorn | ............... | H01M 2/0202 |

(Continued)

FOREIGN PATENT DOCUMENTS

| | | |
|---|---|---|
| DE | 102015201655 A1 | 8/2016 |
| EP | 2299515 A1 | 3/2011 |

OTHER PUBLICATIONS

INPI Search Report and Written Opinion for FR 1750771 dated Oct. 10, 2017 (7 pages).

*Primary Examiner* — Matthew J Merkling
(74) *Attorney, Agent, or Firm* — Crowe & Dunlevy

(57) ABSTRACT

A battery structure has structure anode and cathode contacts on a front face and on a rear face. The battery structure includes a battery having battery anode and cathode contacts only on a front face thereof. A film including a conductive layer and an insulating layer jackets the battery. The conductive layer extends over the battery anode and cathode contacts and is interrupted therebetween. Openings are provided in the insulating layer on the front and rear faces of the battery structure to form the structure anode and cathode contacts of the battery structure.

16 Claims, 4 Drawing Sheets

(56) References Cited

U.S. PATENT DOCUMENTS

| | | | |
|---|---|---|---|
| 2006/0286448 A1* | 12/2006 | Snyder | H01M 2/0275 |
| | | | 429/176 |
| 2007/0139001 A1* | 6/2007 | Hahn | H01M 2/0277 |
| | | | 320/112 |
| 2008/0032236 A1* | 2/2008 | Wallace | H01M 6/40 |
| | | | 430/319 |
| 2009/0214899 A1* | 8/2009 | Shakespeare | H01M 2/0426 |
| | | | 429/7 |
| 2011/0076568 A1* | 3/2011 | Bouillon | H01M 2/0207 |
| | | | 429/246 |
| 2015/0188186 A1* | 7/2015 | Bedjaoui | H01M 10/0436 |
| | | | 429/152 |
| 2015/0380710 A1 | 12/2015 | Morley et al. | |

* cited by examiner

BATTERY WITH FRONT FACE AND REAR FACE CONTACTS

PRIORITY CLAIM

This application claims the priority benefit of French Application for Patent No. 1750771, filed on Jan. 31, 2017, the disclosure of which is hereby incorporated by reference in its entirety to the maximum extent allowable by law.

TECHNICAL FIELD

The present application relates to a battery with contacts on the front face and on the rear face and a method for modifying a battery having anode and cathode contacts on the front face into a battery having anode and cathode contacts on the front face and on the rear face.

BACKGROUND

FIGS. 1A and 1B illustrate a planar electronic component 1 of square form. The electronic component 1 can, for example, be a microbattery or a lithium battery.

FIG. 1A is a plan view. The component 1 comprises two contact metallizations 3 and 5 respectively, for example, the cathode (+) and anode (−) terminals of a battery. The metallizations 3 and 5 are positioned on an edge of the component 1, for example on two consecutive (i.e., adjacent) corners of a top face 7 of the component 1. Each contact metallization 3, 5 is for example of triangular form and has a vertex corresponding to a corner of the component 1.

FIG. 1B is a side view of the electronic component 1. The contact metallization 5 is positioned in a corner of the top face 7 of the component 1 but does not extend right through to the bottom face. The same applies for the contact metallization 3, not visible in FIG. 1B.

FIG. 2 illustrates an example of parallel assembly of electronic components 1 of the type of that presented in FIGS. 1A and 1B. The components are stacked according to an axis Z orthogonal to the plane of the components and of the figure, and are staggered relative to one another by a length L, along an axis X orthogonal to the axis Z and to the side of the component bearing the metallizations 3 and 5. The length L is chosen to reveal the contact metallizations 3 and 5 of each successive component 1. To produce a parallel assembly, the contact metallizations 3 and 5 of the components 1 are respectively interconnected by connections 11 and 13, for example lines of solder.

The assembly of FIG. 2 presents the drawback of being bulky and unreliable when it involves stacking a large number of components.

SUMMARY

One embodiment provides for making the anode and cathode contacts of a battery accessible on both faces of said battery.

Thus, one embodiment provides a battery structure having anode and cathode contacts on the front face and on the rear face comprising a battery having anode and cathode contacts on the front face only, this battery being jacketed in a film comprising a conductive layer and an insulating layer, the conductive layer resting on the anode and cathode contacts of the battery and being interrupted between these anode and cathode contacts, and the insulating layer comprising openings on the front and rear faces of the battery to form anode and cathode contacts of the battery structure.

According to one embodiment, the film is fixed to the battery by an adhesive layer.

According to one embodiment, a first cavity and a second cavity pass through the conductive layer and the adhesive layer, the first cavity being positioned above the anode contact and the second cavity being positioned above the cathode contact, said cavities being filled with a conductive material.

Another embodiment provides a method for modifying a battery having anode and cathode contacts on the front face, comprising: covering of the front face of the battery with a film comprising an insulating layer and a conductive layer, this film being folded down over the rear face of the battery, production of a trench in the conductive layer to interrupt the latter between the front face anode and cathode contacts of the battery, production of openings in the insulating layer so as to reveal contacts on the front face and on the rear face of the final battery.

According to one embodiment, the trench is produced before the covering of the battery with the film.

According to one embodiment, the openings are produced before the covering of the battery with the film.

According to one embodiment, the film is fixed onto the battery by an adhesive layer.

According to one embodiment, a first cavity is produced in the adhesive layer and the conductive layer then filled with a conductive material to connect the conductive layer and the anode contact, and a second cavity is produced in the adhesive layer and the conductive layer then filled with conductive material to connect the conductive layer and the cathode contact.

According to one embodiment, the insulating layer is glued to the conductive layer.

According to one embodiment, the insulating layer has a thickness of between 10 and 30 μm.

According to one embodiment, the insulating layer is made of polyethylene terephthalate.

According to one embodiment, the conductive layer has a thickness of between 10 and 30 μm.

According to one embodiment, the conductive layer is made of a metal.

According to one embodiment, the conductive layer is made of aluminium.

BRIEF DESCRIPTION OF THE DRAWINGS

These features and advantages, and others, will be explained in detail in the following description of particular embodiments given in a nonlimiting manner in relation to the attached figures in which.

DETAILED DESCRIPTION

Same elements have been designated by the same references in the different figures and, in addition, the various figures are not drawn to scale. In the interests of clarity, only the elements that are useful to understanding the embodiments described have been represented and are detailed.

In the following description, when reference is made to absolute position qualifiers, such as the terms "front", "rear", "left", "right", etc., or relative position qualifiers, such as the terms "above", "below", "top", "bottom", etc., reference is made to the orientation of the figures in a normal position of use. Unless specified otherwise, the expression "of the order of" means to within 10%, preferably to within 5%.

Figure 3:
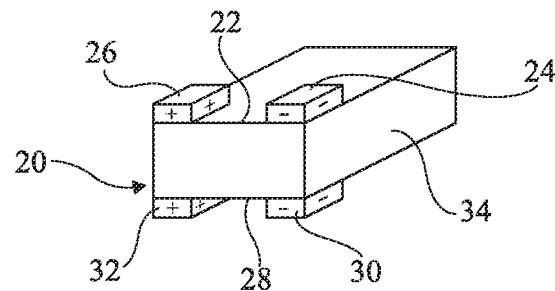
FIG. 3 is a perspective view of an embodiment of a battery.

FIG. 3 is a perspective view of an embodiment of a battery 20. The battery 20 comprises, on its front face 22, an anode contact (−) 24 and a cathode contact (+) 26. The battery 20 also comprises, on its rear face 28, an anode contact (−) 30 and a cathode contact (+) 32. As an example, the anode contact 24 is placed facing the anode contact 30 and the cathode contact 26 is placed facing the cathode contact 32. A block 34 designates the rest of the battery, that is to say the active layers of the battery, such as the anode, cathode and electrolyte layers, and possibly the substrate on which the battery is formed. The battery 20 is for example a lithium battery, and can be a lithium microbattery formed by the deposition of thin layers on a thin substrate. An advantage of batteries with anode and cathode contacts on the front face and on the rear face is that it is possible to stack them vertically as will be shown in relation to FIGS. 4A and 4B.

As an example, as is represented in FIG. 3, the battery has a square or rectangular form, but, as a variant, the battery 20 could have any other form, for example circular. As an example, as is represented in FIG. 3, the anode and cathode contacts are of square form and are disposed in corners of the battery 20, but, as a variant, these contacts will be able to be triangular, polygonal or circular and be disposed in various ways on the battery 20, for example on protruding areas.

As a variant, the anode and cathode contacts of the battery 20 will be able to be flush with the surfaces 22 and 28 of the battery, even be slightly set back relative to these surfaces 22 and 28.

Figure 4A:
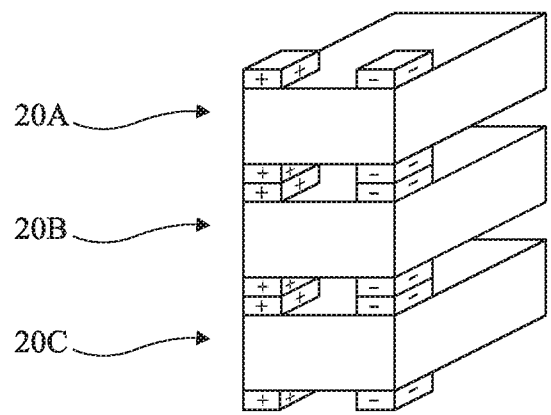
FIGS. 4A and 4B are perspective views of stackings of batteries of the type of that of FIG. 3.
Figure 4B:
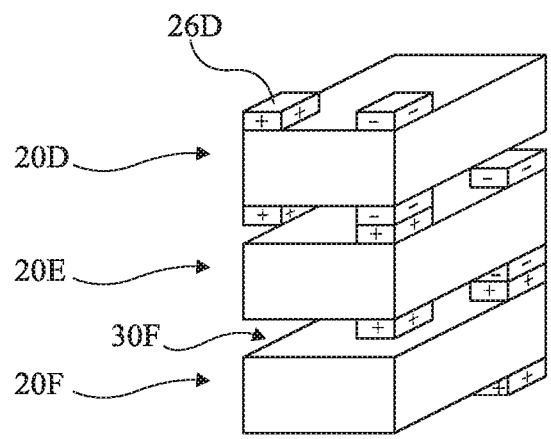

FIGS. 4A and 4B are perspective views of various possible assemblies of batteries 20.

FIG. 4A represents a parallel assembly of three batteries 20A, 20B and 20C of FIG. 3. The batteries 20A, 20B and 20C are stacked so as to:

position the rear face anode contact of each upper battery on the front face anode contact of the immediately lower battery; and position the rear face cathode contact of each upper battery on the front face cathode contact of the immediately lower battery.

The cathode contact of the battery obtained by the assembly is formed by the cathode contacts of the batteries 20A, 20B and 20C. The anode contact of the battery obtained by the assembly is formed by the anode contacts of the batteries 20A, 20B and 20C. In practice, the contact connections will be able to be made on the anode and cathode contacts of the upper battery 20A of the assembly or on the anode and cathode contacts of the lower battery 20C of the assembly.

FIG. 4B represents a series assembly of three batteries 20D, 20E and 20F of FIG. 3. In this case, the batteries 20D, 20E and 20F are stacked vertically, and each battery undergoes a rotation of 90 degrees relative to the preceding one, in order to place the front face anode contact of the upper battery facing the front face cathode contact of the immediately lower battery.

The cathode contact of the battery obtained by the assembly is formed by the cathode contact 26D of the top battery 20D of the assembly. The anode contact of the battery obtained by the assembly is formed by the anode contact 30F of the bottom battery 20F of the assembly.

The batteries are fixed to one another for example with a conductive glue disposed at the level of the contacts to be linked. In the case of batteries comprising anode and cathode contacts slightly set back, the quantity of conductive glue will be adjusted in order to ensure a good electrical connection between two facing contacts to be connected. The assembly can be embedded in an encapsulation material.

Furthermore, in order to obtain mechanically robust assemblies, in the case of batteries comprising protruding anode and cathode contacts, it is possible to use spacers (not represented in FIGS. 4A and 4B) to be disposed between the batteries. In the case of contacts that are flush or slightly set back, the batteries can simply be fixed two by two by an adhesive material.

Figure 1A:
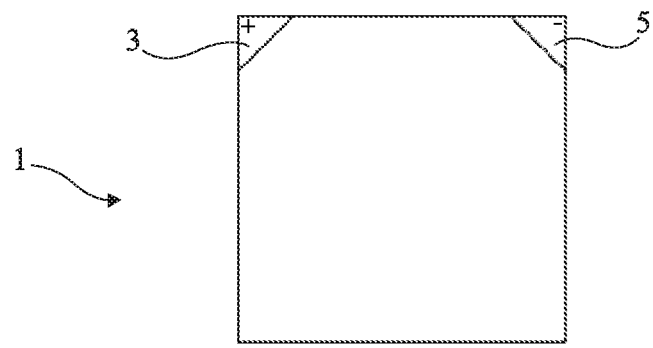
FIGS. 1A and 1B, described previously, are plan and side views of a battery.
Figure 1B:
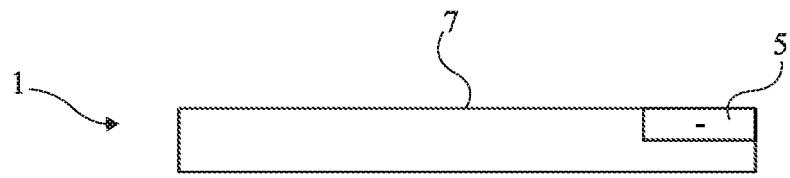
Figure 2:
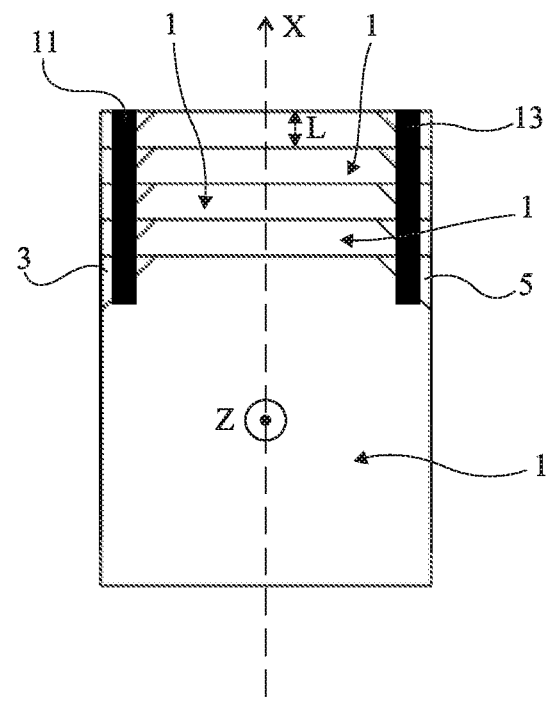
FIG. 2, described previously, is a plan view of a stacking of batteries of FIGS. 1A and 1B.
Figure 5:
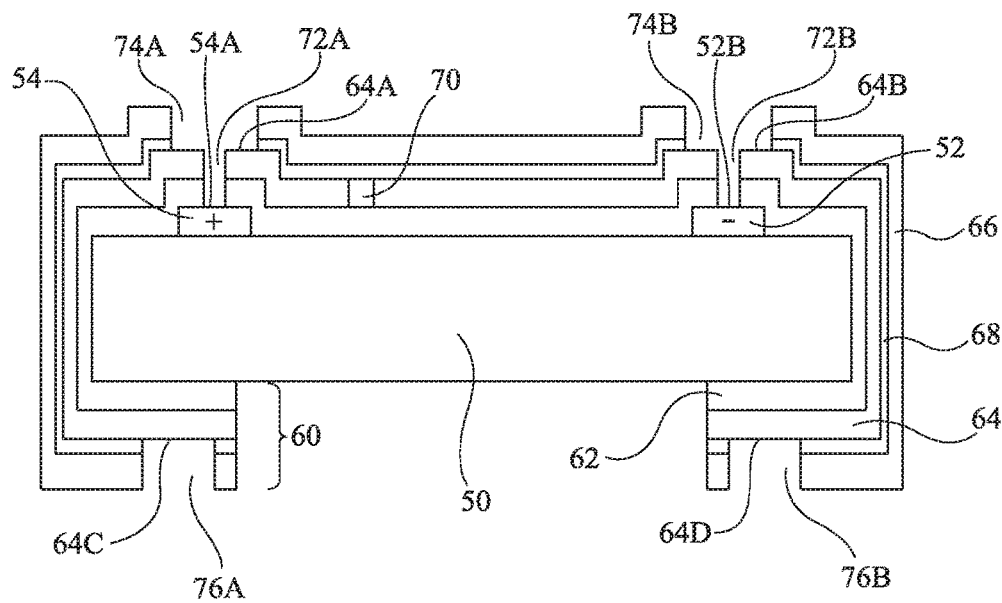
FIG. 5 is a detailed cross-sectional view of an embodiment of a battery at an intermediate step of a method for modifying a battery of the type of that of FIGS. 1A and 1B.

FIG. 5 is a cross-sectional view of an intermediate step of an embodiment of a method for modifying an initial battery with contacts on the front face of the type of that described in relation to FIGS. 1A and 1B into a final battery with contacts on the front face and on the rear face of the type of that described in relation to FIG. 3.

The initial battery comprises a block 50, an anode contact 52 and a cathode contact 54. The block 50 designates all the active layers of the initial battery and for example the substrate on which it is produced. The anode contact 52 is disposed on the top face of the block 50, on the right of FIG. 5. The cathode contact 54 is disposed on the top face of the block 50, on the left of FIG. 5.

A film 60 is disposed on the front face of the initial battery then folded down over its sides and its rear face to form the final battery. The film 60 is, for example, fixed onto the battery using an adhesive layer 62. The adhesive layer 62 is, for example, a polymer (acrylic, solvent or thermofusible glue). The adhesive layer 62 can have a thickness of between 10 and 30 μm, for example of the order of 25 μm. The film 60 comprises a conductive layer 64 in contact with the adhesive layer 62. The conductive layer 64 is, for example, made of a metal, for example, aluminium. The conductive layer 64 can have a thickness of between 10 and 30 μm, for example of the order of 25 μm. The conductive layer 64 is glued to an insulating layer 66 via a layer of glue 68. The insulating layer 66 is, for example, made of a polymer commonly called PET (polyethylene terephthalate). The insulating layer 66 can have a thickness of between 10 and 30 μm, for example of the order of 23 μm. The layer of glue 68 is, for example, made of a polymer (acrylic or solvent or thermofusible glue). The layer of glue 68 can have a thickness of between 1 and 10 μm, for example of the order of 2 μm.

A trench 70 is produced in the conductive layer 64 of the film 60 in order to interrupt this conductive layer between the anode contact and the cathode contact, such that the anode 52 and cathode 54 contacts are not electrically connected by the conductive layer 64. The trench 70 is for example produced by laser etching, for example using an ytterbium laser. The trench 70 has a width of between 20 μm and 2 mm, for example of the order of 1 mm.

Openings 72A and 72B are produced in the layers 62 and 64 of the film 60 facing the anode and cathode contacts of the initial battery. The opening 72A uncovers a portion 54A of the cathode contact 54. The opening 72B uncovers a portion 52B of the anode contact 52. The openings 72A and 72B are, for example, produced by laser etching, for example using an ytterbium laser. The openings 72A and 72B have a width of between 50 μm and 5 mm, for example of the order of 1 mm.

Openings 74A and 74B are produced in the insulating layer 66 and the layer of glue 68 of the film 60, for example, facing the anode and cathode contacts 52 and 54 of the initial battery. The openings 72A and 72B are, for example, produced in the respective continuities of the openings 74A and 74B and have a width less than that of the openings 74A and 74B. The opening 74A uncovers a portion 64A of the conductive layer 64. The opening 74B thus uncovers a portion 64B of the conductive layer 64. The openings 74A and 74B are, for example, produced by laser etching, for example using a carbon dioxide laser. The openings 74A and 74B have, for example, a width of between 100 μm and 20 mm, for example of the order of 5 mm.

Openings 76A and 76B are produced in the layers 66 and 68 of the film 60 on the side of the rear face of the final battery. The openings 76A and 76B are, for example, produced facing the openings 74A and 74B. The opening 76A uncovers a portion 64C of the conductive layer 64. The opening 76B uncovers a portion 64D of the conductive layer 64. The openings 76A and 76B are, for example, produced by laser etching, for example using a $CO_2$ laser. The openings 76A and 76B have, for example, a width of between 100 μm and 20 mm, for example of the order of 5 mm.

As an example, before it is mounted over the battery, the film is positioned with conductive face 64 at the front. The trench 70 is etched in the conductive layer 64. The film is then positioned with the insulating face at the front. The openings 74A, 74B, 76A and 76B are etched in the insulating layer and in the layer of glue. Then, the adhesive layer 62 is fixed onto the free face of the conductive layer 64 of the film 60. The openings 72A and 72B are etched in the conductive layer 64 and in the adhesive layer 62. The film is for example then deposited on the initial battery, for example by lamination.

Figure 6:
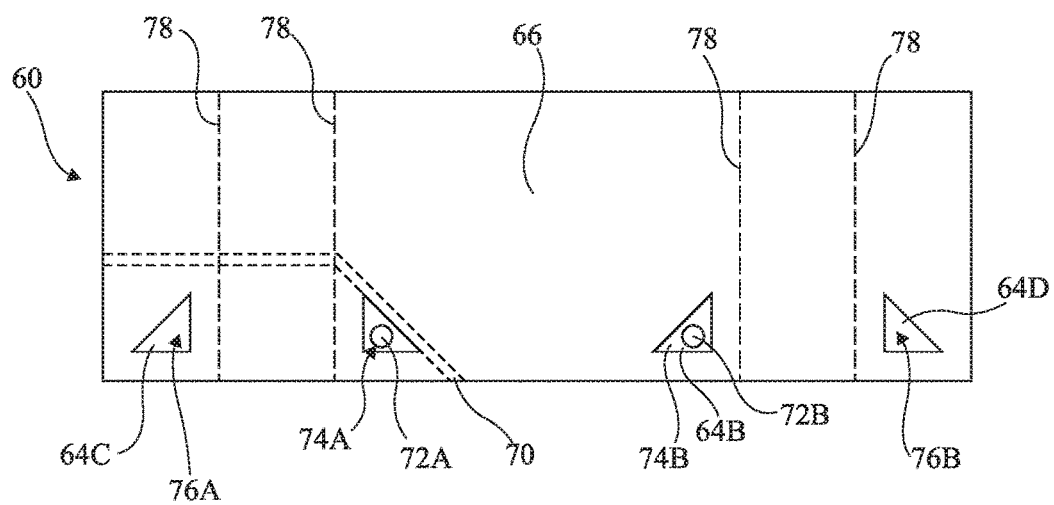
FIG. 6 is a plan view of a film used in the battery of FIG. 5.

FIG. 6 is a plan view of an exemplary embodiment of a film 60 described in relation to FIG. 5 before it is put in place on the initial battery. The film 60 is, for example, of rectangular form and has dimensions matched to the dimensions of the battery to be covered. The film 60 is folded down over the battery according to folds 78 symbolized by dotted lines.

The openings 72A and 72B are, for example, of circular form and pass right through a thickness of the film 60. The openings 74A and 74B are, for example, of triangular form. The openings 76A and 76B are, for example, of triangular form. An example of the path of the trench 70 is symbolized by dotted lines.

Figure 7:
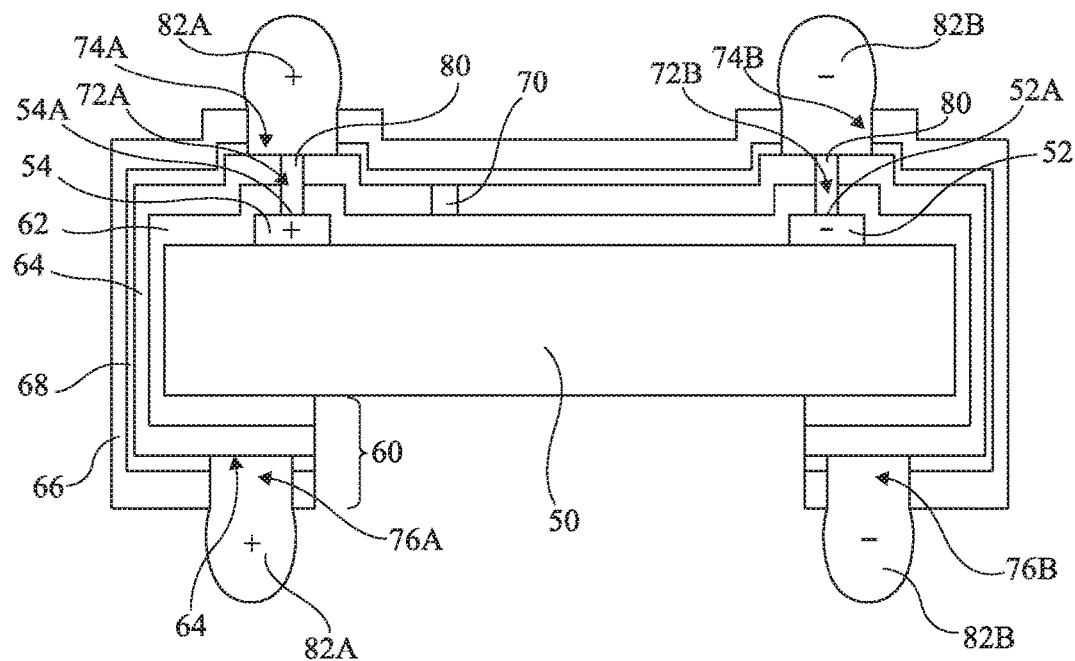
FIG. 7 is a detailed cross-sectional view of the battery of FIG. 5 at a final step of its manufacturing method.

FIG. 7 is a cross-sectional view of a subsequent step to that described in relation to FIG. 5. In this step, the anode and cathode contacts of the final battery are formed. For that, the openings 72A and 72B are filled with a conductive material 80, for example a metal (silver) epoxy glue, or flowable solder microballs (BUMP) or even conductive (inkjet). Thus, the anode and cathode contacts 52 and 54 of the initial battery are linked electrically to the conductive layer 64. The trench 70 prevents the short-circuiting of the anode and the cathode of the initial battery. Next, conductive BUMP contacts 82A are formed in the openings 74A and 76A. The conductive BUMP contacts 82A constitute the cathode contacts of the final battery. Conductive BUMP contacts 82B are formed in the openings 74B and 76B. The conductive BUMP contacts 82B constitute the anode contacts of the final battery.

As a variant, the formation of the BUMP contacts 82A and 82B can be omitted. The portions 64A, 64B, 64C and 64D of the conductive layer 64 then form anode and cathode contacts on the two faces of the battery.

As a variant, certain portions 64A, 64B, 64C and 64D of the conductive layer 64 will be able to be provided with conductive BUMP contacts while others will not. For example, the anode and cathode contacts of one and the same face of the battery will be able to be provided with conductive BUMP contacts whereas the anode and cathode contacts of the opposite face will not. Thus, the conductive BUMP contacts of one face of the battery will be able to be adapted to be connected to the contacts without conductive BUMP contacts of the opposite face of a second battery.

Figure 8:
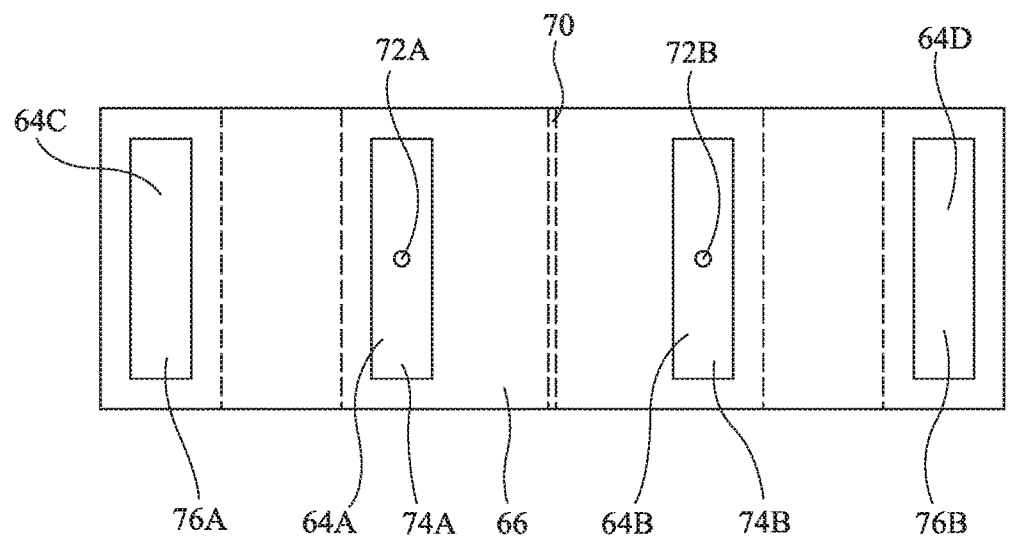
FIG. 8 is a plan view of a variant embodiment of the film of FIG. 6.

FIG. 8 is a plan view of a variant embodiment of a film 60. An advantage of the use of a film such as the film 60 is that it is possible to produce anode and cathode contacts of various sizes and of various forms. Thus, the film 60 comprises openings 74A, 74B, 76A and 76B of rectangular form revealing portions 64A, 64B, 64C and 64D of the conductive layer 64 of greater surface area than those of the film 60 presented in relation to FIG. 6. Similarly, it would also be possible to reduce the surface area of the portions 64A, 64B, 64C and 64D.

Particular embodiments have been described. Miscellaneous variants and modifications will become apparent to a person skilled in the art. In particular, it is possible to produce the trench 70 and the openings 72A, 72B, 74A, 74B, 76A and 76B once the film 60 is deposited on the battery.

It is obvious to a person skilled in the art that it is possible to mount contacts on the lateral faces of a battery and not only on its rear face.

The film could be in the form of a cross and could thus cover the four lateral faces of a battery in straight block form. Similarly, the film could be adapted to different forms of batteries.

It is obvious to a person skilled in the art that it would be possible to produce contacts on the front face of the battery without these contacts being positioned directly in line with the contacts of the initial battery.

The modification method described here will be able to be applied to electronic components other than a battery, for example electronic chips, integrated circuits, etc. More particularly, this modification method will be able to be applied to components having more than two terminals to be mounted on other faces of said components.

Miscellaneous embodiments with miscellaneous variants have been described above. It will be noted that a person skilled in the art will be able to combine miscellaneous elements of these miscellaneous embodiments and variants without demonstrating inventive step.

The invention claimed is:

1. A battery structure, comprising:
   battery structure anode and cathode contacts on a front face and on a rear face of the battery structure;
   a battery having battery anode and cathode contacts on a front face of the battery only, and
   a jacket film comprising a conductive layer and an insulating layer, the conductive layer extending over the battery anode and cathode contacts and being interrupted between the battery anode and cathode contacts such that said battery anode and cathode contacts are not electrically connected to each other by the conductive layer, and the insulating layer comprising openings on the front and rear faces of the battery structure to form said battery structure anode and cathode contacts.

2. The battery structure according to claim 1, wherein the jacket film is fixed to the battery by an adhesive layer.

3. The battery structure according to claim 2, wherein the openings on the front face of the battery structure each comprise a first cavity and a second cavity that pass through the conductive layer and the adhesive layer, the first cavity being positioned above the battery anode contact and the second cavity being positioned above the battery cathode contact, said first and second cavities being filled with a conductive material.

4. The battery structure according to claim 1, wherein the insulating layer is glued to the conductive layer.

5. The battery structure according to claim 1, wherein the insulating layer has a thickness of between 10 and 30 µm.

6. The battery structure according to claim 1, wherein the insulating layer is made of polyethylene terephthalate.

7. The battery structure according to claim 1, wherein the conductive layer has a thickness of between 10 and 30 µm.

8. The battery structure according to claim 1, wherein the conductive layer is made of a metal.

9. The battery structure according to claim 8, wherein the metal for the conductive layer is aluminum.

10. A battery apparatus, comprising:
a battery having a battery anode contact and a battery cathode contact, wherein the battery anode contact and battery cathode contact are present only on a front face of the battery;
a film comprising an insulating layer and a conductive layer, wherein the film is mounted to the front face of the battery and extends and is further mounted to side edges of the battery and further extends and is further mounted to at least part of a rear face of the battery;
wherein said conductive layer includes an interruption in conductivity of the conductive layer located between the battery anode contact and battery cathode contact on the front face of the battery;
wherein the film further includes:
a first opening extending through the film to the battery anode contact;
a second opening extending through the film to the battery cathode contact;
a first battery apparatus anode contact electrically connected to the battery anode contact through the first opening;
a first battery apparatus cathode contact electrically connected to the battery cathode contact through the second opening;
a second battery apparatus anode contact electrically connected to the conductive layer of the film on the rear face of the battery; and
a second battery apparatus cathode contact electrically connected to the conductive layer of the film on the rear face of the battery.

11. The battery apparatus of claim 10, wherein the interruption in conductivity of the conductive layer electrically isolates the battery anode contact from the battery cathode contact.

12. The battery apparatus of claim 10, wherein the film is mounted to the battery by an adhesive layer.

13. The battery apparatus of claim 10, further comprising a conductive material filling the first and second openings to electrically connect the conductive layer to each of the battery anode contact and battery cathode contact.

14. The battery apparatus of claim 10, wherein the conductive layer is made of a metal.

15. The battery apparatus of claim 14, wherein the metal for the conductive layer is aluminum.

16. The battery apparatus of claim 10, wherein the insulating layer is made of polyethylene terephthalate.

* * * * *